United States Patent [19]

Bott

[11] Patent Number: 4,501,385
[45] Date of Patent: Feb. 26, 1985

[54] CROSS RAIL FOR VEHICLE LUGGAGE CARRIER

[76] Inventor: John A. Bott, 931 Lakeshore Dr., Grosse Pointe Shores, Mich. 48236

[21] Appl. No.: 483,929

[22] Filed: Apr. 11, 1983

Related U.S. Application Data

[63] Continuation of Ser. No. 355,022, Mar. 5, 1982, abandoned, which is a continuation of Ser. No. 171,398, Jul. 23, 1980, abandoned.

[51] Int. Cl.³ .............................................. B60R 9/04
[52] U.S. Cl. .................................. 224/319; 224/316; 224/321; 224/325
[58] Field of Search ............... 224/310, 316, 321–326, 224/319; 403/331, 381, 345

[56] References Cited

U.S. PATENT DOCUMENTS

| | | | |
|---|---|---|---|
| 3,281,030 | 10/1966 | Gosswiller | 224/322 |
| 3,325,067 | 6/1967 | Helm | 224/321 |
| 3,451,602 | 6/1969 | Bott | 224/321 |
| 3,677,451 | 7/1972 | Burland | 224/322 |
| 4,015,760 | 4/1977 | Bott | 224/326 X |
| 4,106,680 | 8/1978 | Bott | 224/324 |
| 4,124,155 | 11/1978 | Kowalski | 224/326 |
| 4,132,335 | 1/1979 | Ingram | 224/324 |
| 4,239,139 | 12/1980 | Bott | 224/324 |
| 4,245,764 | 1/1981 | Kowalski et al. | 224/324 X |
| 4,269,340 | 5/1981 | Kowalski et al. | 224/321 X |

Primary Examiner—Allan N. Shoap
Attorney, Agent, or Firm—Harness, Dickey & Pierce

[57] ABSTRACT

A cross rail for a luggage carrier system having a cross-section having a leading edge to diminish wind resistance and a longitudinally extending channel formed by the interior surfaces of the cross rail. The cross rail can be roll formed of two different materials, an outer skin of a more aesthetically pleasing material and an inner section of a relatively less expensive material. The cross rail is substantially hollow and includes a support for maintaining the cross rail from being crushed by normal loads incident to use with a luggage carrier system.

5 Claims, 5 Drawing Figures

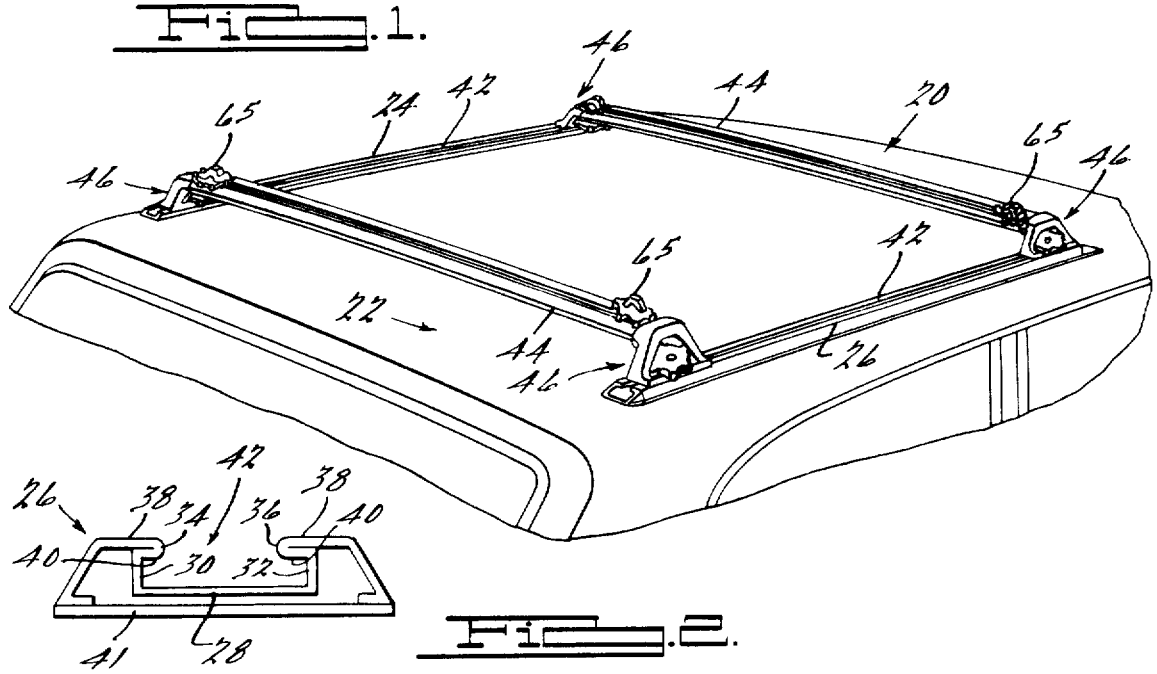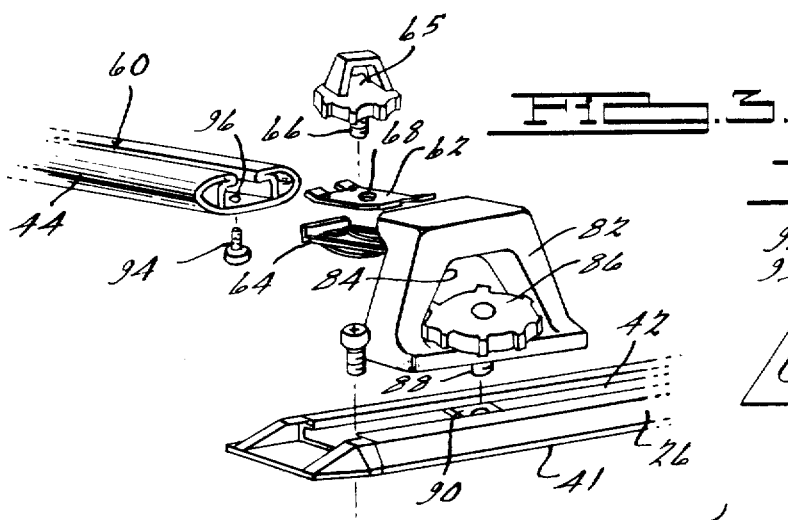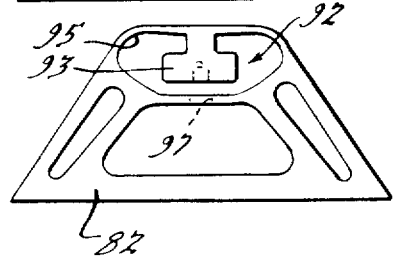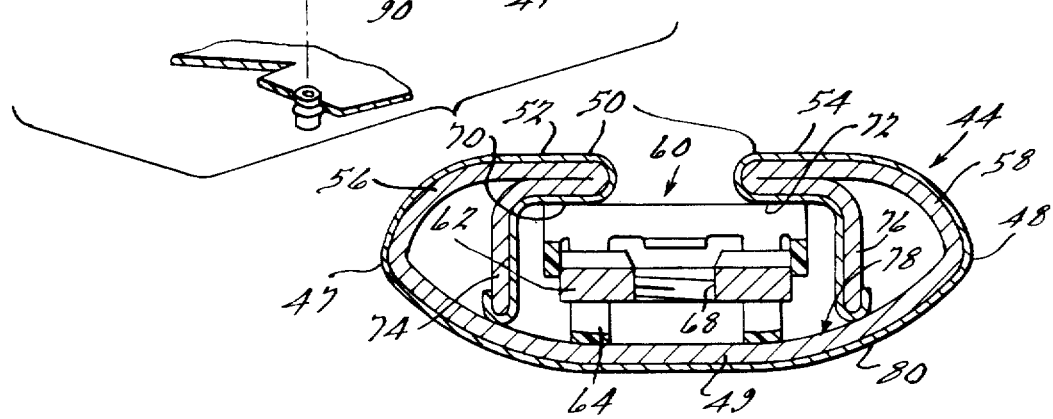

CROSS RAIL FOR VEHICLE LUGGAGE CARRIER

This is a continuation of application Ser. No. 355,022, filed Mar. 5, 1982, abandoned, which is a continuation of Ser. No. 171,398, filed July 23, 1980, abandoned.

BACKGROUND AND SUMMARY OF THE INVENTION

The present invention relates generally to vehicle luggage carriers and more particularly to a new and improved cross rail for vehicle luggage carriers shown in the applicant's U.S. Pat. No. 4,099,658 and Ser. No. 57,346, filed July 13, 1979. More specifically, the improved cross rail is to be used with luggage carriers of the type comprising two or more slat-type elements which are fixedly secured to an exterior horizontal surface of a vehicle, such as the trunk lid or vehicle roof, and which are permanently attached thereto and adapted to have ancillary article constraining members removably and adjustably secured thereto.

The cross rail of the present invention is specifically designed as an improved cross rail which also incorporates the object of adjustably securing article restraining members, such as tie downs, utility bars or rails, to the luggage carrier system, and also may secure ancillary article carrying equipment, such as ski racks, bicycle racks and the like to the luggage carrier system.

Wind resistance is a significant consideration in the field of luggage carriers for vehicles, particularly due to the effect that wind resistance due to luggage carrier has in decreasing the fuel economy of the vehicle to which the luggage carrier is attached. Thus, another object of the present invention is to provide a cross rail having a channel to provide the above advantages while also having a contoured aerodynamic transverse cross-section having a leading edge to diminish the wind resistance of the cross rail attendant to the movement of the vehicle. Yet another object is to provide the above contoured cross-section and the channel while also providing sufficient strength along the length of the cross rail to prevent the cross rail from collapsing or crushing under loads normally carried upon the above described luggage carrier systems.

A further important consideration in the manufacture of luggage carriers, and in particular cross rails having all the features of the present invention, is to provide a cross rail that is relatively inexpensive to manufacture, easy to install, convenient to use and also which is durable, aesthetically appealing, and light in weight. A significant advantage of the construction of the present invention is that the construction permits the cross rail to be roll formed with a lamination of two different materials, an outer skin of an aesthetically appealing relatively more expensive material and a less expensive inner material.

Other objects and advantages of the instant invention will be apparent in the following specification, claims and drawings.

BRIEF DESCRIPTION OF THE DRAWINGS

FIG. 1 is an elevated perspective view of one embodiment of the vehicle luggage carrier of the present invention shown in operative association with a portion of an automotive vehicle;

FIG. 2 is a vertical sectional view of a slat of FIG. 1;

FIG. 3 is an exploded assembly view of a portion of the luggage carrier illustrated in FIG. 1;

FIG. 4 is an elevated side view of the stanchion of FIG. 3;

FIG. 5 is an enlarged transverse vertical sectional view of the cross rail of FIG. 3.

DESCRIPTION OF THE PREFERRED EMBODIMENTS

Referring now in detail to the drawings and in particular to FIG. 1, the present invention is illustrated as comprising a luggage carrier 20 which is operatively associated with a vehicle roof portion 22 and includes a pair of longitudinally extending, laterally spaced slats 24 and 26 as described in detail in U.S. Pat. No. 4,099,658. Referring to FIG. 2, each of these slats comprises a generally flat lower base portion 28 and a pair of upstanding, spaced parallel side portions 30, 32 which terminate at their upper ends in a pair of laterally extending, generally coplanar arranged flanges numbered 34 and 36, respectively. The flanges 34, 36 define upper and lower clamping surfaces 38, 40 respectively, and provide the longitudinally extending channel 42. Each slat 24, 26 is set on a pad 41 and both the pad 41 and the slat 24 or 26 are mounted to the roof 22.

The luggage carrier 20 further comprises a pair of cross rails, generally designated by the numeral 44, which extend laterally or transversely between the slats 24, 26, are spaced upwardly from the plane of the roof portion 22, and are operatively supported upon the slats 24, 26 by means of a plurality of four stanchion assemblies, generally designated by the numeral 46, which are located one at each end of the cross rails 44. The cross rails 44 are preferably of the aerodynamic cross-sectional shape shown in FIG. 5 and comprise a substantially elliptical external cross-sectional configuration, having a leading edge (47 or 48, depending upon the relationship of the cross rail 44 to the movement of the vehicle), having a continuous arcuate bottom or lower portion 49 and a flat upper surface 50 comprised of two longitudinally extending flats 52 and 54. Flats 52 and 54 have arcuate portions 56 and 58 attached thereto extending from each of said flats integrally to the bottom portion 49 at the edges 47 and 48. Between the flats 52 and 54, a track or channel 60 is formed by the interior surfaces of the cross rail 44 which is coextensive of the length of the cross rails 44. The track or channel 60 of each of the cross rails 44 is adapted to receive one or more clamping plates 62 which may be provided with retainer elements 64 to prevent longitudinal sliding movement of the clamping plates 62 when associated tie down members 65 or the like have their downwardly extending externally threaded stud elements 66 disengaged from the threaded bores 68 of the clamping plates 62. The interior surfaces comprising the channel 60 are interior flats 70 and 72 and downwardly extending rib portions 74 and 76 which provide support along the cross rail 44 against crushing or collapse of the cross rail 44 when supporting a heavy load.

The construction of the cross rails 44 of the present invention permits the use of two different materials as shown in FIG. 5 to efficiently take advantage of any economy in using a less expensive inner material for the inner cross rail section 78 without losing the aesthetic appeal of the more expensive material, which can be implemented as a skin 80 over the inner section 78. In the preferred embodiment, although the thickness dimensions may vary, the inner section 78 is constructed of an inexpensive steel approximately 0.05 inches thick and the skin 80 is a relatively more costly metal, such as that marketed under the trademark Galvaneel, of a thickness on the order of 0.012 to 0.015 inches. A sheet of each is placed together and rollformed into the construction illustrated in FIG. 5.

Each of the stanchion assemblies 46 comprises a stanchion body 82 which may, for example, be fabricated of injection molded plastic or die-cast metal, and defines a central recess or opening 84 within which an adjustment knob or element 86 is rotatably disposed. Extending downwardly from the adjustment elements 86 are externally threaded stubs 88 which are threadably engageable with clamping plates 90 slidably disposed within the slats 24, 26. The clamping plates 90 cooperate with the elements 86 in adjustably securing the stanchion assemblies 46 at selected longitudinal positions along the slats 24, 26. As illustrated in FIG. 4, each of the stanchion bodies 82 includes an inwardly projecting mounting portion 92 kwhich is comprised of a boss 93 adapted to be telescopically received within the adjacent end of the channel 60 of an associated cross rail 44 and an extended sleeve 95 having an internal contour adapted to telescopically receive the same cross rail 44. The cross rail 44 is secured to the stanchion 82 at the sleeve 95 and the boss 93 by means of a suitable screw, bolt or the like 94 which extends upwardly through an opening 97 in the sleeve 95 and aperture 96 in the adjacent end of the cross rail 44, whereby the cross rails 44 and stanchion assemblies 46 are longitudinally adjustable along the slats 24, 26 and are concomitantly removable therefrom when it is desired to minimize the structural components of the luggage carrier 20 during periods of non-use or when the cross rails 44 are not required to operatively support articles upon the associated vehicle.

Alternatively, the cross rail 44 of the present invention may also be used as an adjustable cross rail between the side rails of a luggage carrier similar to that shown in U.S. Pat. No. 4,133,465, and has various other possible applications to many other types of luggage carrier systems.

It will be seen from the foregoing that the present invention provides a new and improved luggage carrier which embodies a number of features not shown in the prior art. In general, the luggage carrier of the present invention provides an arrangement by which the luggage or article constraining members may be conveniently adjusted to accommodate different size articles and may be totally removed from the carrier during periods of non-use, thereby minimizing wind noise and wind resistance to the extreme. Additionally, the luggage carrier of the present invention provides a construction which diminishes wind noise and wind resistance by providing cross rails having a more aerodynamic cross-section while also having the luggage constraining cross rails longitudinally adjustable, so that loads of various sizes and configurations may be supported upon the luggage rack. An additional feature of the present invention resides in the fact that the above advantages may be combined in the various ancillary article constraining members, such as ski racks, bike racks, utility boxes, etc., removably secured to the cross rails in a laterally adjustable manner along the channel 60, so as to further enlarge the number of potential uses of the luggage carrier.

What is claimed is:

1. In a luggage carrier disposed on a horizontal surface of an automobile vehicle,
   an elongated cross rail member elevated from said surface of said vehicle and a supporting end portion disposed at each end of said member clampingly adjustably engageable with said luggage carrier, said cross rail member having a cross section with a generally oval external surface configuration, having a leading edge, a trailing edge, a continuous bottom surface extending from said leading edge to said trailing edge and disposed on a continuous bottom wall portion, a pair of continuous upper surfaces disposed on a pair of continuous upper wall portions, a channel formed between said upper surfaces, including a first pair of interior surfaces parallel to at least a portion of said upper surfaces and a second pair of interior surfaces disposed on a pair of interior walls extending substantially perpendicularly downwardly one from each of said first pair of interior surfaces, each of said interior walls extending from substantially the interior of one of said upper wall portions into contact with the interior of said continuous bottom wall, forming an interior bottom surface of said channel along said bottom wall, each said supporting end portion having means adapted to be telescopically engageable with the other surfaces of said cross rail member and with said channel for engagement of said cross rail member and each said end portion together.

2. A claim in accordance with claim 1, further comprising an outer skin made of one material and an inner section of a different, less expensive material.

3. A claim in accordance with claim 1, wherein the said cross rail member has a substantially hollow inner section.

4. A claim in accordance with claim 1, wherein said cross rail member is roll formed.

5. A claim in accordance with claim 1, wherein said member has an upper surface wherein a substantially flat surface comprises at least a portion of said upper surface.

* * * * *